US012762793B2

(12) United States Patent
Sakurahara et al.

(10) Patent No.: US 12,762,793 B2
(45) Date of Patent: Oct. 13, 2026

(54) DEVICE, METHOD AND PROGRAM THAT CREATE 3D MODELS

(71) Applicant: NTT, Inc., Tokyo (JP)

(72) Inventors: Yusuke Sakurahara, Tokyo (JP); Mitsuyasu Yanagida, Tokyo (JP); Yukihiro Goto, Tokyo (JP); Takashi Ebine, Tokyo (JP)

(73) Assignee: NTT, Inc., Tokyo (JP)

( * ) Notice: Subject to any disclaimer, the term of this patent is extended or adjusted under 35 U.S.C. 154(b) by 93 days.

(21) Appl. No.: 18/711,659

(22) PCT Filed: Nov. 25, 2021

(86) PCT No.: PCT/JP2021/043232
§ 371 (c)(1),
(2) Date: May 20, 2024

(87) PCT Pub. No.: WO2023/095255
PCT Pub. Date: Jun. 1, 2023

(65) Prior Publication Data
US 2025/0014271 A1 Jan. 9, 2025

(51) Int. Cl.
*G06T 17/00* (2006.01)

(52) U.S. Cl.
CPC .......... *G06T 17/00* (2013.01); *G06T 2210/56* (2013.01)

(58) Field of Classification Search
CPC ..... G06T 17/00; G06T 2210/56; G06V 20/64; G01B 11/24
See application file for complete search history.

(56) References Cited

U.S. PATENT DOCUMENTS

| | | | | |
|---|---|---|---|---|
| 2021/0103727 | A1* | 4/2021 | Maruyama | G06V 20/176 |
| 2022/0292761 | A1* | 9/2022 | Jung | G06V 20/176 |

FOREIGN PATENT DOCUMENTS

| | | |
|---|---|---|
| JP | 20151901 | 1/2015 |
| JP | 201578849 | 4/2015 |
| JP | 2017156179 | 9/2017 |
| JP | 2018195240 | 12/2018 |
| JP | 202160776 | 4/2021 |

OTHER PUBLICATIONS

Y. Jwa and G. Sohn, "A piecewise catenary curve model growing for 3D power line reconstruction," Photogrammetric Engineering & Remote Sensing, vol. 78, No. 12, pp. 1227-1240, 2012. (Year: 2012).*

(Continued)

*Primary Examiner* — William A Beutel
(74) *Attorney, Agent, or Firm* — Fish & Richardson P.C.

(57) ABSTRACT

There is provided an apparatus for creating a three-dimensional model of an object having a small diameter from point cloud data representing three-dimensional coordinates. The apparatus is configured to cluster points included in the point cloud data, obtain a curve passing through points in a cluster for at least one cluster, extract point clouds disposed on a curve coincident with the curve passing through the points, and create a three-dimensional model of the object by connecting the extracted point clouds.

5 Claims, 15 Drawing Sheets

(56) References Cited

OTHER PUBLICATIONS

Shen, Xiaojun; Qian, Chuan; Du, Yong; Yu, Xinle; and Zhang, Rui (2018) "An automatic extraction algorithm of high voltage transmission lines from airborne LIDAR point cloud data," Turkish Journal of Electrical Engineering and Computer Sciences: vol. 26: No. 4, Article 30. (Year: 2018).*

Yang, Juntao; Kang, Zhizhong; Zhou, Yang. "A Robust Model Fitting-based Method for Transmission Line Extraction from Airborne LIDAR Point Cloud Data", Journal of Geodesy and Geoinformation Science; Beijing vol. 4, Iss. 3, (Sep. 2021) (Year: 2021).*

Qing Xiang, Jonathan Li, Chenglu Wen, Pengdi Huang, "Extraction of power lines from mobile laser scanning data", Proceedings vol. 9901, 2nd ISPRS International Conference on Computer Vision in Remote Sensing (CVRS 2015); 990105 (2016) (Year: 2016).*

Cheng et al. (Cheng, L.; Tong, L.; Wang, Y.; Li, M. Extraction of Urban Power Lines from Vehicle-Borne LiDAR Data. Remote Sens. 2014, 6, 3302-3320. https://doi.org/10.3390/rs6043302) (Year: 2014).*

* cited by examiner

DEVICE, METHOD AND PROGRAM THAT CREATE 3D MODELS

TECHNICAL FIELD

The present disclosure relates to a technology for creating a three-dimensional model from point cloud data representing three-dimensional coordinates.

BACKGROUND ART

A technology for three-dimensionally modeling an outdoor structure by an in-vehicle three-dimensional laser scanner (mobile mapping system: MMS) has been developed (see, for example, Patent Literature 1). In the technology of Patent Literature 1, a point cloud and a scan line are created in a space where no point cloud exists, and then a three-dimensional model is created.

Since the MMS can acquire a point cloud while moving along an object, the point cloud of a measurement range can be acquired evenly at equal intervals to some extent. On the other hand, a three-dimensional model needs to be created using a point cloud acquired by a fixed 3D laser scanner. However, the fixed 3D laser scanner creates a dense point cloud at a short distance from a measurement point and a coarse point cloud at a long distance, and this characteristic can be more remarkably exhibited depending on a size and shape of an object.

In the related art, points are complemented to form a scan line to a certain threshold of an inter-cloud distance. However, in a case where the inter-cloud distance is significantly long and some points at long distances are not regarded as a point cloud on the same object, no point can be complemented between points. Therefore, in the 3D modeling by the fixed 3D laser scanner, a problem arises in that it is difficult to create a three-dimensional model of an object having a small diameter, such as an overhead cable on a utility pole.

CITATION LIST

Patent Literature

Patent Literature 1: JP 2017-156179 A (NTT)

SUMMARY OF INVENTION

Technical Problem

An object of the present disclosure is to enable a three-dimensional model to be created even for an object which has unevenly spaced inter-point distances and only a part of a point cloud.

Solution to Problem

According to the present disclosure, there are provided an apparatus and a method for creating a three-dimensional model of an object having a small diameter from point cloud data representing three-dimensional coordinates, the apparatus and the method being configured to perform clustering points included in the point cloud data, obtaining a curve passing through the points in a cluster for at least one cluster, extracting a point cloud disposed on a curve coincident with the curve passing through the points; and creating a three-dimensional model of the object by connecting the extracted point cloud.

Advantageous Effects of Invention

According to the present disclosure, it is possible to create a three-dimensional model of an object without depending on a distance between three-dimensional points. Therefore, the present disclosure enables a three-dimensional model to be created even for an object which has unevenly spaced inter-point distances and only a part of a point cloud.

DESCRIPTION OF EMBODIMENTS

Figure 1:
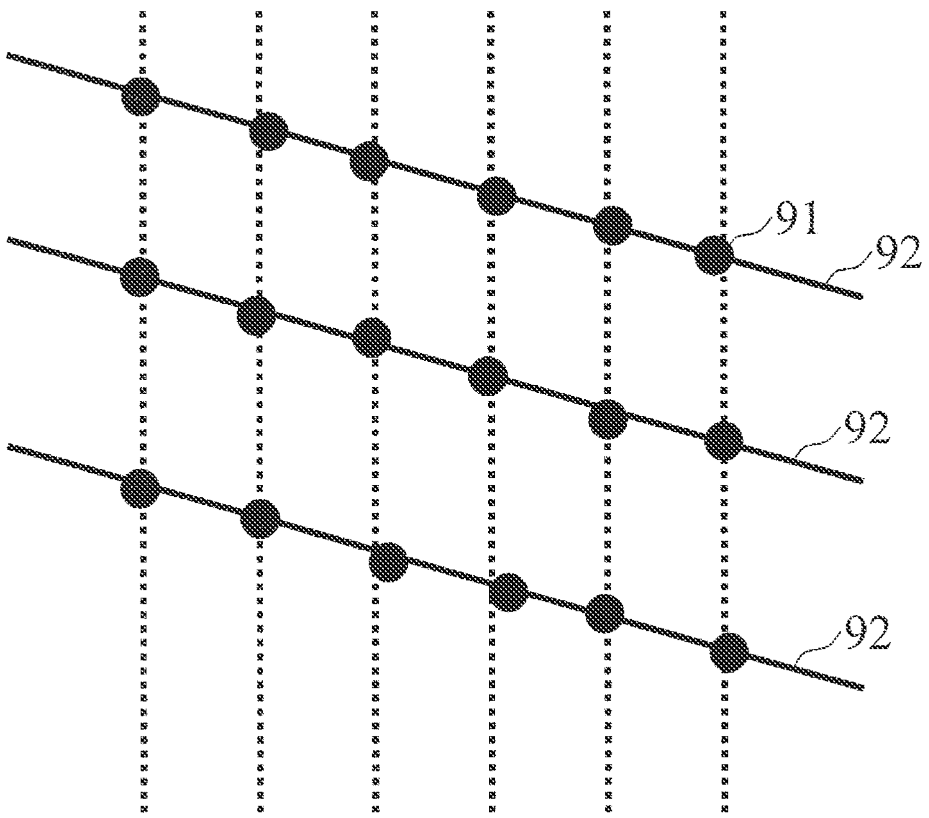
FIG. 1 illustrates an example of three-dimensional point cloud data.

Hereinafter, embodiments of the present disclosure will be described in detail with reference to the drawings. The present disclosure is not limited to the embodiments to be described below. These embodiments are merely examples, and the present disclosure can be carried out in forms of various modifications and improvements based on knowledge of those skilled in the art. Components assigned the same reference numerals in the present specification and the drawings are the same components.

Outline of Present Disclosure

Figure 2:
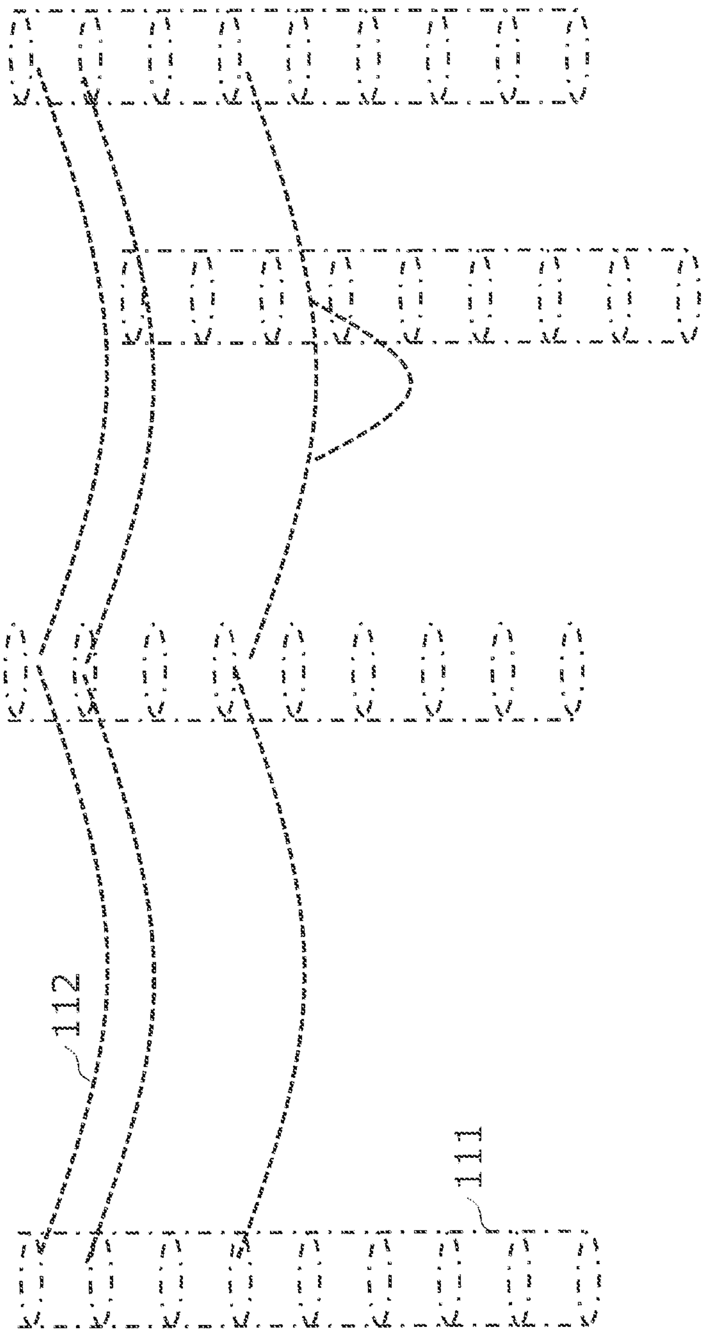
FIG. 2 illustrates an example of a three-dimensional model in which a structure is objectified.

The present disclosure provides an apparatus and a method for creating a three-dimensional model of an object from point cloud data representing three-dimensional coordinates acquired by a three-dimensional laser scanner. FIG. 1 illustrates an example of point cloud data. The point cloud data is data representing a surface shape of an object such as a structure as a set of points 91, and individual points 91 represent three-dimensional coordinates on a surface of the structure. By forming a line 92 connecting the points 91 of the three-dimensional point cloud data, it is possible to create a three-dimensional model in which a structure is objectified. For example, as illustrated in FIG. 2, a three-dimensional utility pole model 111 and a three-dimensional cable model 112 can be created.

Figure 3:
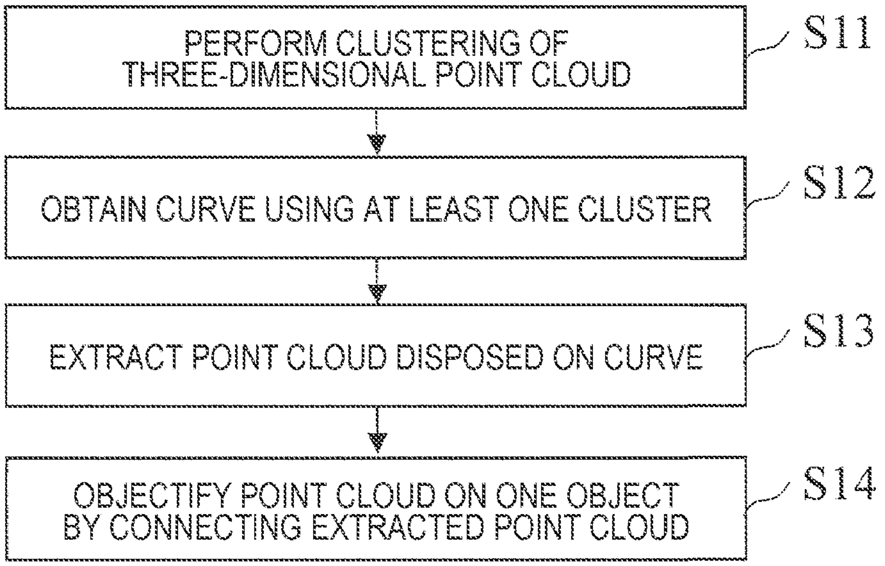
FIG. 3 illustrates an example of a method for creating a three-dimensional model from point cloud data of the present disclosure.

FIG. 3 illustrates an example of a method of the embodiment.

The present disclosure includes: Step S11 of clustering points 91 included in the point cloud data, Step S12 of obtaining a curve passing through the points 91 in a cluster for at least one cluster of clusters generated by the clustering, Step S13 of extracting point clouds disposed on a curve coincident with the curve, and Step of S14 of creating a three-dimensional model of the object by connecting the extracted point clouds.

In the present disclosure, since the points located on the curve are connected, it is possible to create a three-dimensional model in which point clouds on the same target object are objectified even when the points are greatly separated from each other. Therefore, in the present disclosure, the cable model 112 can be created, even for a small-diameter object such as an overhead cable, a suspension wire, or a horizontal branch wire. Hence, the present disclosure can detect a state of target equipment having a small diameter such as an overhead cable.

First Embodiment

In this embodiment, an example in which the target equipment having a small diameter is a cable and a curve is a catenary curve is described.

Figure 4:
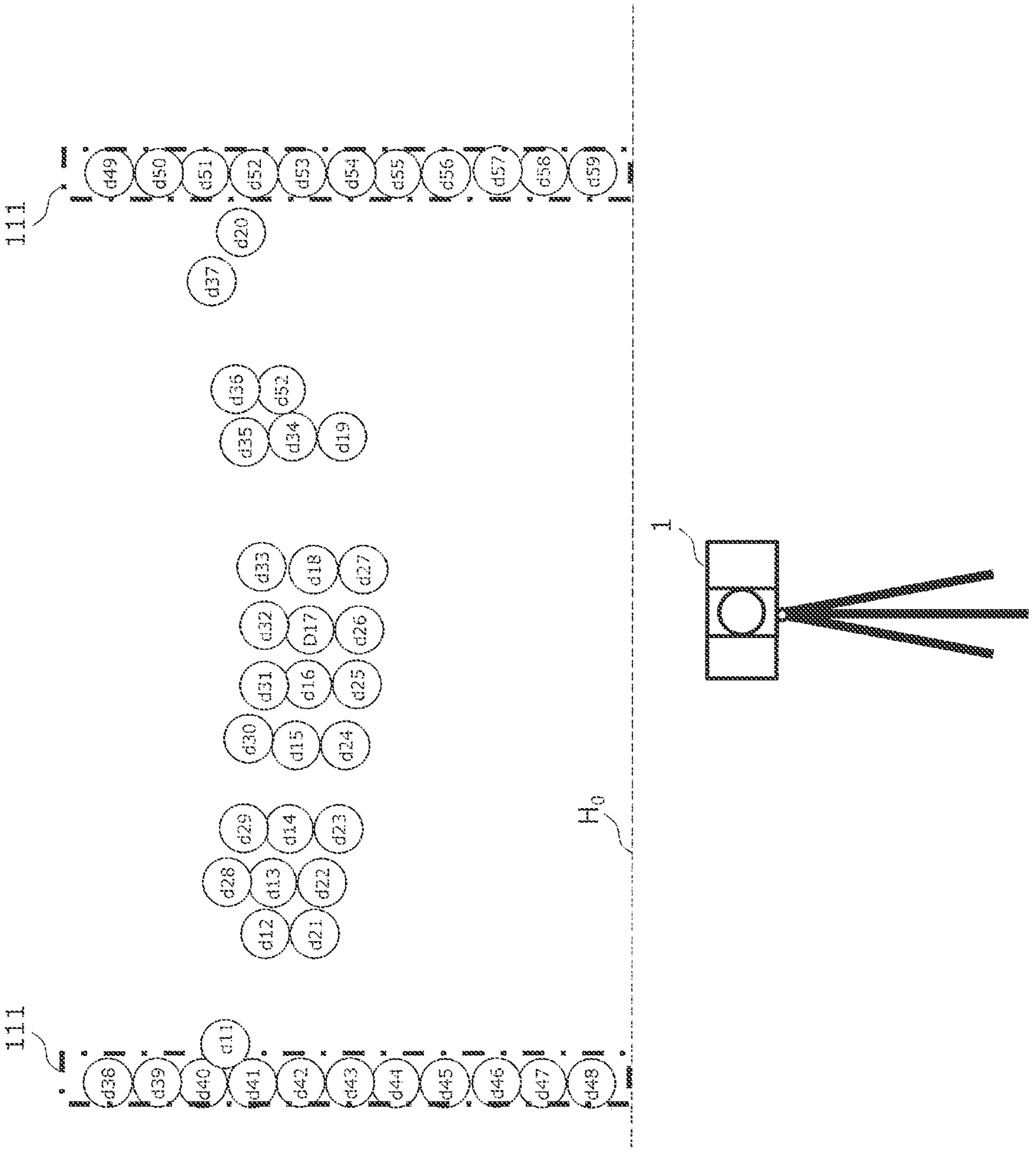
FIG. 4 illustrates an example of a point cloud acquired by a three-dimensional laser scanner.
Figure 5:
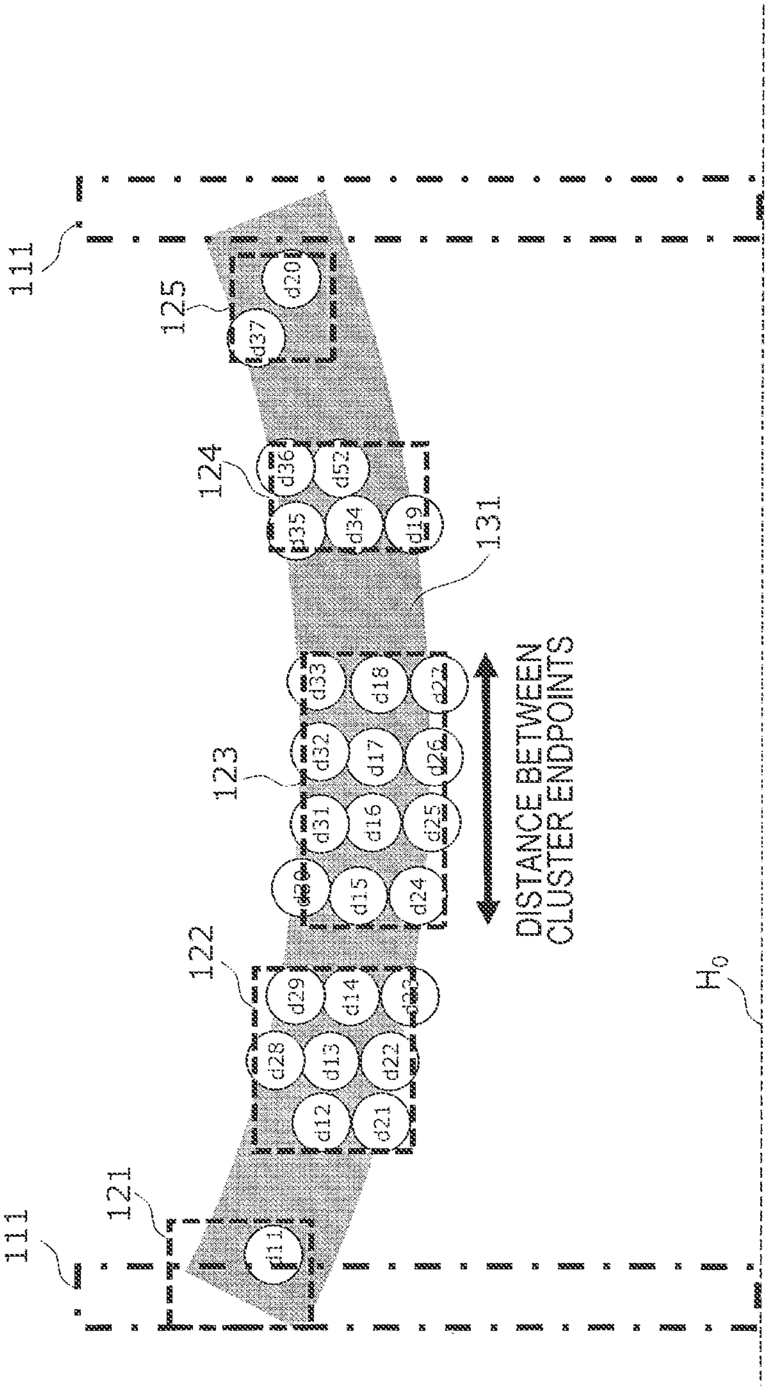
FIG. 5 illustrates an example of clusters and an approximate curve.

In Step S11, a point mass assumed to be a structure other than the cable is automatically deleted to generate a cable possibility cluster. For example, when a point cloud is points d11 to d48 as illustrated in FIG. 4, the points d38 to d48 and d49 to d59 corresponding to the utility pole model 111 are determined, the utility pole model 111 is generated, and the points d38 to d48 and d49 to d59 are deleted. Consequently, cable possibility clusters 121 to 125 as illustrated in FIG. 5 are generated. At this time, a ground $H_0$ at a point where the cable is laid out can be identified using the points d38 to d48 and d49 to d59.

In Step S11, a specific example of a method of deleting a mass of point clouds other than the cable is optional. For example, the point cloud is converted into voxels. When voxels are viewed in an x-y plane, in a case where the point cloud is P % or more in m×n squares by DBSCAN, voxels may be deleted as a point mass of a house or the ground other than the cable. Here, DBSCAN is one clustering technique and is a technique of regarding a point cloud included in a condition where there are a certain number or more of points within a threshold distance from a certain point, as one mass and forming the cluster.

Then, in Step S12, a three-dimensional straight line is calculated from the generated point cloud of the cable possibility clusters 121 to 125 through straight line approximation by RANSAC, and a catenary curve 131 is calculated using the straight line. On the other hand, since the cable looks straight on the x-y plane, linear approximation is performed from the point cloud of the cable possibility clusters 121 to 125. Consequently, the point cloud corresponding to the cable can be extracted from the point cloud included in the cable possibility clusters 121 to 125. The catenary curve 131 including a z direction is calculated using a point cloud falling within a residual by using the straight line corresponding to the cable. Here, the x-y plane indicates a plane parallel to the ground, and for example, an x axis can be north and south, and a y axis can be east and west. The z axis indicates an axis perpendicular to the ground and is an axis in a direction representing the height.

Figure 6:
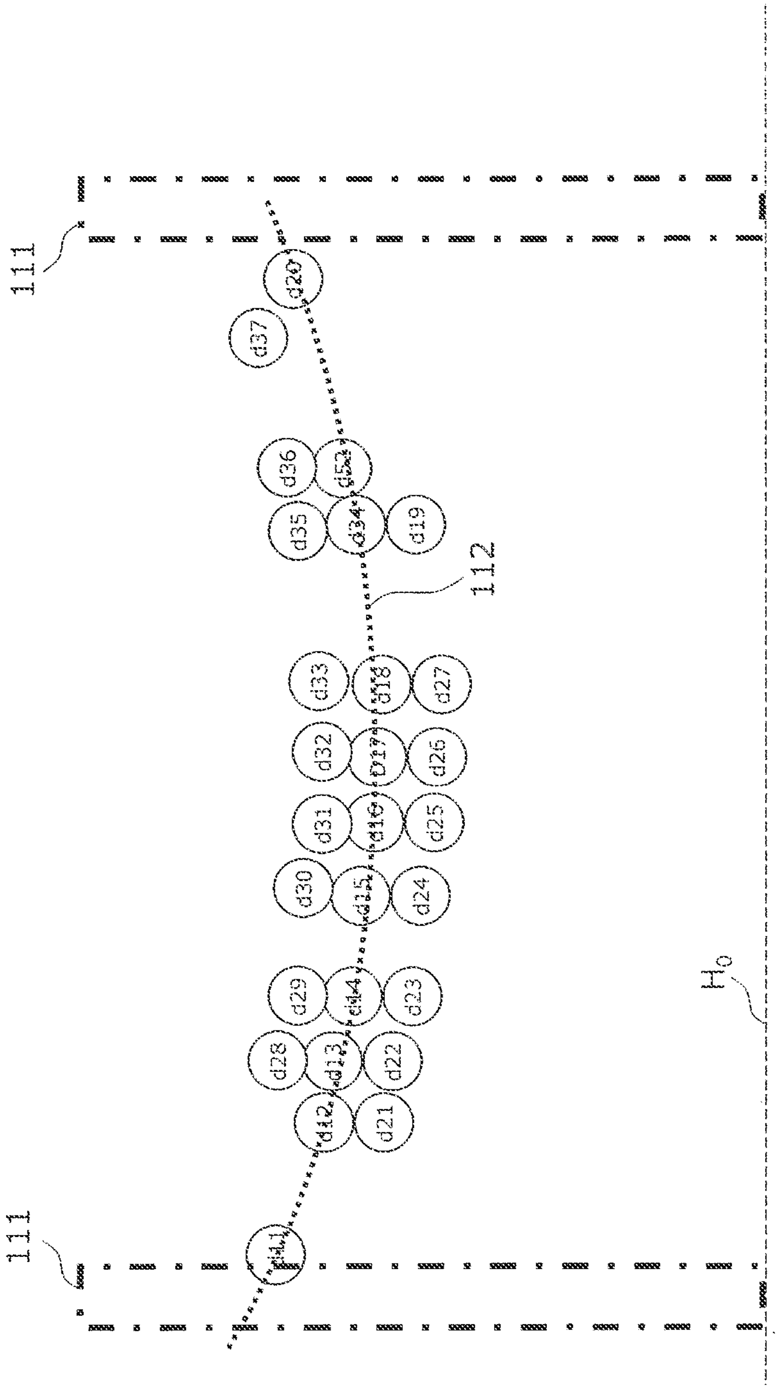
FIG. 6 illustrates an example of a three-dimensional model created from the point cloud data of the present disclosure.

In Step S14, point clouds disposed on the same straight line on the x-y plane and located on the catenary curve 131 are extracted. Then, the cable model 112 as illustrated in FIG. 6 is created using all the extracted point clouds.

Note that the straight line approximation may be omitted in Step S12. In this case, for example, the catenary curve is directly calculated from a position where the point cloud is dense like the cluster 123 at a central portion between the utility pole models 111 using RANSAC. Then, in Step S13, the point clouds of the cable model possibilities are extracted again from the catenary curve. Consequently, in Step S14, by creating the cable model 112 again using the extracted point clouds, a more accurate cable model can be created.

When the catenary curve 131 is calculated in Step S12, remaining point clouds illustrated in FIG. 5 are three-dimensionally clustered by DBSCAN. For example, of the point clouds included in the clusters 121 to 125, a cluster in which an angle formed by the straight line obtained by RANSAC and the z axis is equal to or larger than a certain value is defined as a cable possibility cluster. In the embodiment, an example in which the clusters 121 to 125 correspond to cable possibility clusters will be described. Here, RANSAC is a learning method for estimating a parameter of a mathematical model to be calculated by excluding an influence of an outlier from data including the outlier as much as possible.

In the embodiment, a straight distance between endpoints of the cable possibility cluster calculated by RANSAC is stored as a cluster length. Then, the cluster 123 having the maximum calculated cluster length is selected. Next, RANSAC straight line approximation is performed on the x-y plane for the point cloud included in the cluster 123. Since the RANSAC straight line can be expressed by a "fixed point" and a "value obtained by multiplying a direction vector by a variable T", any point included in the cluster 123 is set as the fixed point, and the z direction is a function of T to perform catenary approximation. Consequently, it is possible to calculate the catenary curve 131.

Clusters 121, 122, 124 and 125 other than the cluster 123 are included in the point cloud, a cluster that is located on a straight line on the x-y plane and is located on the catenary curve 131 in a three-dimensional space is extracted, and the extracted cluster is determined as a joined cluster constituting the same target object. The cable model 112 is created from the curve approximation of RANSAC using all the points included in the joined cluster for each finally extracted joined cluster.

In the embodiment, since the cable model is created using the cluster located on the catenary curve 131, the cluster can be used for model creation even if the cluster is not present at a constant distance. Therefore, in the embodiment, the cable model can be created regardless of a distance between points. In addition, in the embodiment, since model creation is performed after a point cloud other than the cable possibility is deleted, the processing speed can be increased.

Second Embodiment

A point cloud that is too large in the z-axis direction is highly likely to be a utility pole or a wall surface. Therefore, in this embodiment, when the point cloud other than the cable is deleted in Step S11, the point cloud that is too large in the z-axis direction is excluded from the cluster.

Figure 7:
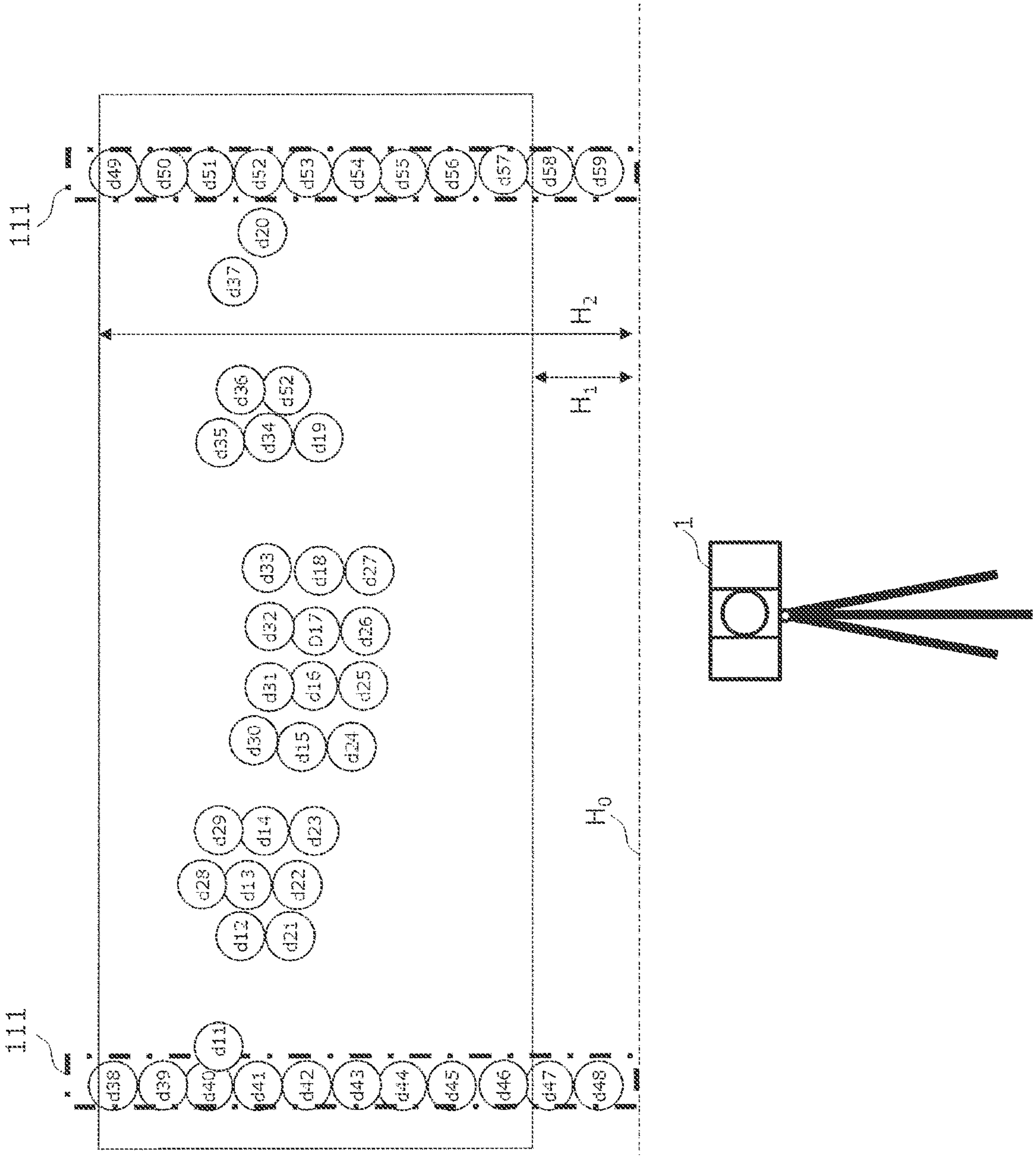
FIG. 7 is an explanatory diagram of processing of excluding a point cloud that is too large in a z-axis direction from a cluster.

For example, in the embodiment, as illustrated in FIG. 7, the ground $H_0$ at the point where the cable is laid out is identified using the points d38 to d48 and d49 to d59. Then, after a point cloud having a certain height (for example, 4 m or higher and 8 m or lower) from the ground $H_0$ to $H_1$ or higher and $H_2$ or lower is extracted, clustering is three-dimensionally performed by DBSCAN. Thereafter, as illustrated in FIG. 5, of the point clouds included in clusters, a cluster within a certain reference size is set as a cable possibility cluster among clusters in which an angle formed by a straight line obtained by RANSAC and the z axis is equal to or larger than a certain value.

In the embodiment, since the clustering is performed after the point cloud other than the cable possibility is deleted, the processing speed can be increased.

Overall Configuration

Figure 8:
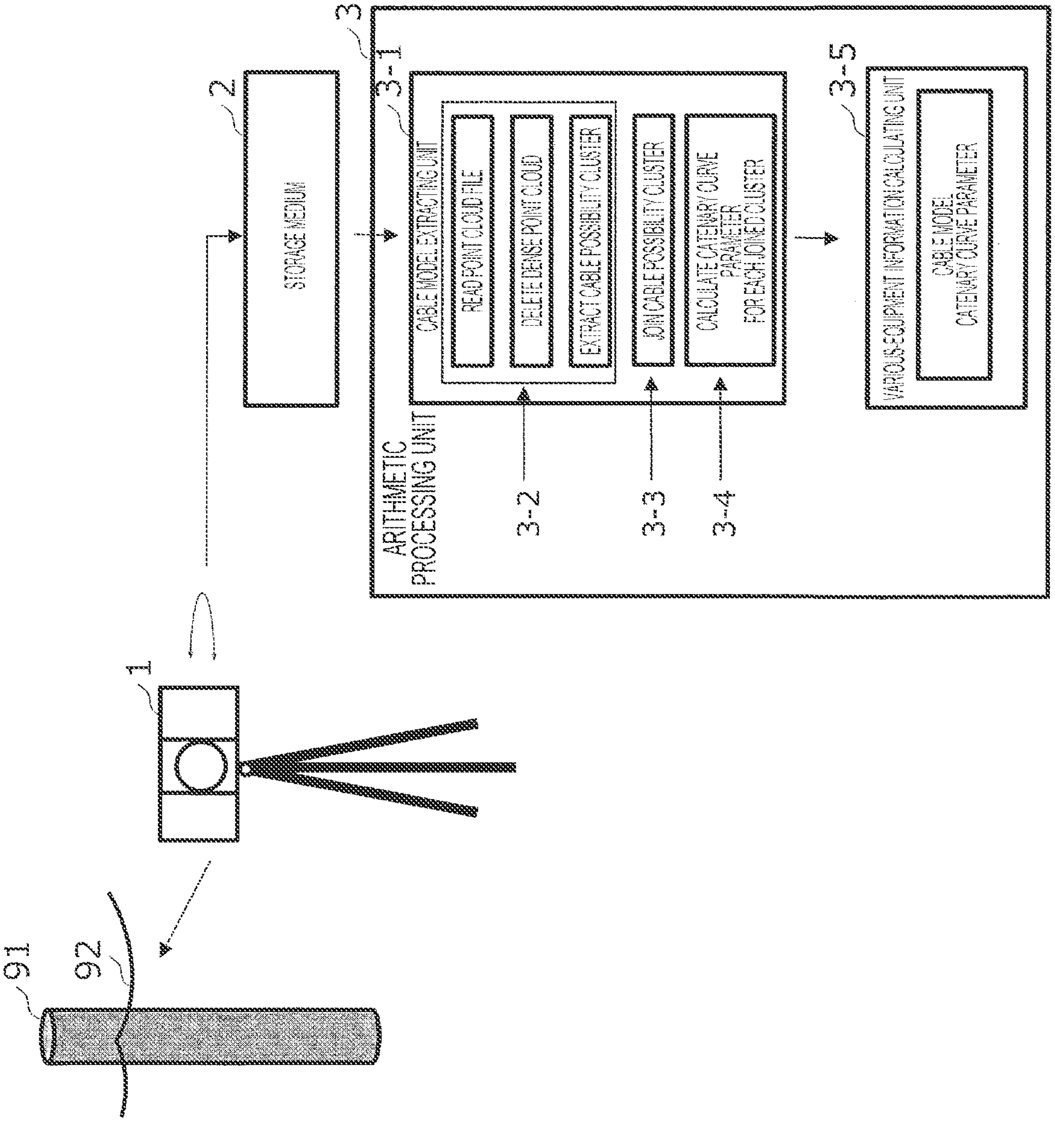
FIG. 8 illustrates a configuration example of a system of the present disclosure.

FIG. 8 illustrates a configuration example of a system of the present disclosure. The system of the present disclosure includes a fixed 3D laser scanner 1, a storage medium 2, and an arithmetic processing unit 3. The arithmetic processing unit 3 includes a cable model extracting unit 3-1 and a various equipment information calculating unit 3-5. The apparatus of the present disclosure includes the arithmetic processing unit 3 and may further include the storage medium 2. Further, the apparatus of the present disclosure can also be implemented by a computer and a program, and the program can be recorded in a recording medium or provided through a network.

The system of the present disclosure stores the point cloud acquired by the fixed 3D laser scanner 1 in the storage medium 2. The point cloud to be stored is, for example, a point cloud as illustrated in FIG. 1.

The cable model extracting unit 3-1 includes functional units 3-2 to 3-4.

The functional unit 3-2 reads the point cloud data as an input and deletes a point cloud determined as a dense point cloud from the read point cloud data. At this time, for example, DBSCAN or the like, which is a general clustering technique, is used to delete a point cloud having a certain density or higher on a two-dimensional plane.

Then, the functional unit 3-2 performs clustering (clustering when the number of point clouds within a certain distance is equal to or larger than a certain number, using DBSCAN, which is a general clustering technique) again from the point cloud other than the dense point cloud. Then, the functional unit 3-2 extracts, as a cable possibility cluster, a cluster that can be determined to be a straight line by RANSAC and a cluster having a straight line component at a certain angle or larger with respect to the vertical axis, as a characteristic of the cluster.

The functional unit 3-3 joins, among the extracted clusters, first a cluster having the longest distance between the endpoints of the cluster and clusters on a curve obtained by a catenary curve approximation expression of the cluster as joined clusters constituting the same object, in descending order of the distance between the endpoints of the clusters. At this time, a residual from the RANSAC approximate straight line may be used to determine a cluster on the curve by the catenary curve approximate expression. Consequently, the joined cluster determination processing can be speeded up.

The functional unit 3-4 calculates a parameter of the fitted catenary curve for each joined cluster and outputs the parameter.

The various equipment information calculating unit 3-5 extracts the cable model 112 coincident with the catenary curve by using the parameter calculated by the functional unit 3-4.

Figure 9:
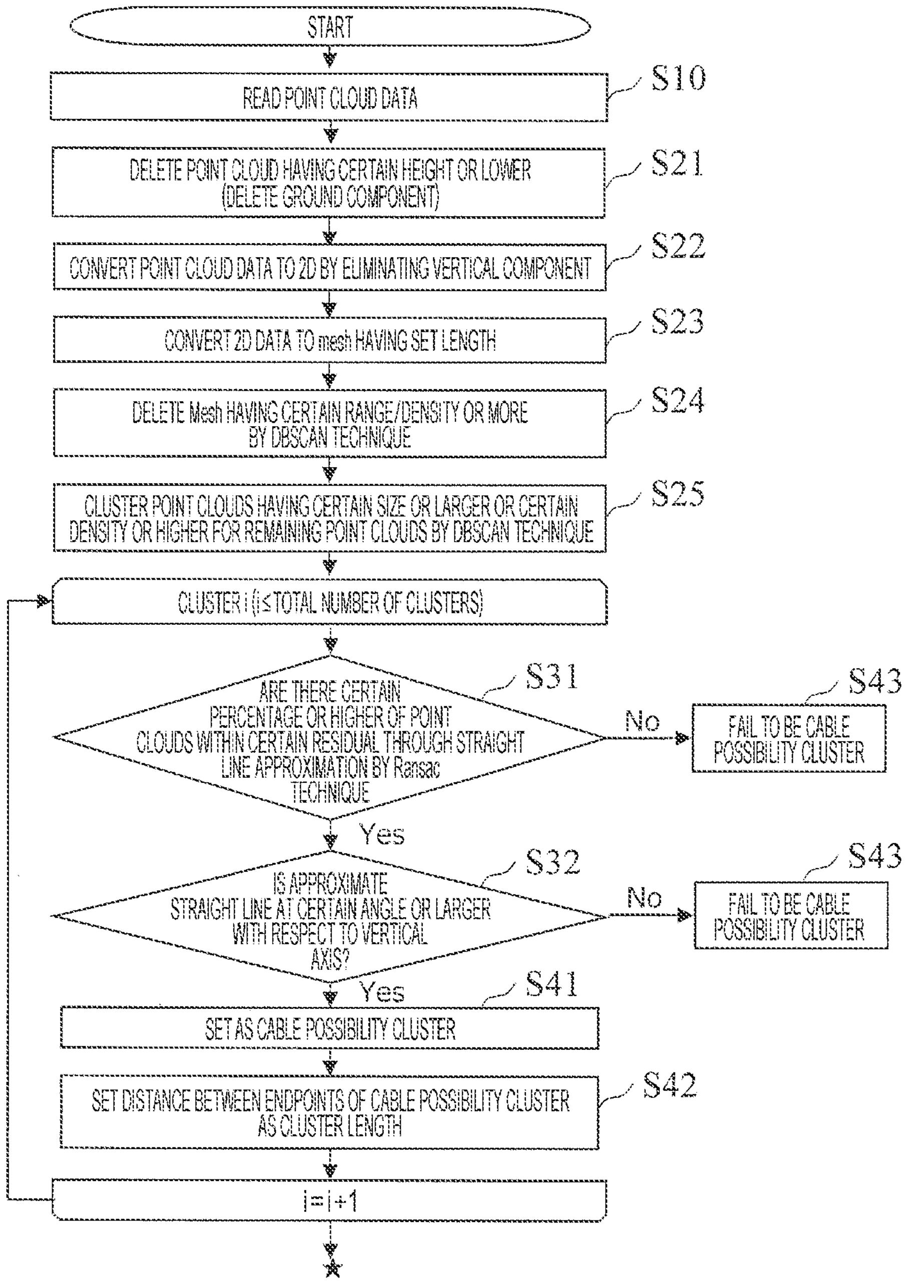
FIG. 9 illustrates an example of a flowchart of processing in a functional unit 3-2.

FIG. 9 illustrates an example of a flowchart of processing in the functional unit 3-2. In a case where a point cloud of a utility pole or a tree is removed in advance before a cluster is generated, there is no obstacle (object other than the ground) such as a tree or a house above and below the cable. In this case, the functional unit 3-2 executes the following processing.

The point cloud data is read (S10), and a point cloud having a height equal to or less than a certain height is deleted (S21). For example, the ground component is deleted.

Next, the point cloud data is two-dimensionalized on the x-y plane without vertical components (S22), and the two-dimensionalized data is set as a mesh having a set length (S23). Then, the mesh having a certain range/density or more is deleted by the DBSCAN technique (S24).

Next, for the remaining point clouds, a point cloud having a certain size/density or more is set as a cluster by the DBSCAN technique (S25).

The straight line approximation is performed by the RANSAC technique, and whether there are a certain percentage or higher of point clouds within a certain residual is determined (S31). In addition, it is determined whether the approximate straight line is at a certain angle or more with respect to the vertical axis (S32). Here, the term "within the residual" means that a distance between an approximated straight line and a point cloud falls within a threshold.

In a case where a result is No in at least one of Steps S31 and S32, the cable possibility cluster is not set (S43). On the other hand, in a case where a result is Yes in Steps S31 and S32, a cable possibility cluster is set (S41). Then, a distance between endpoints of the cable possibility cluster is set as a cluster length (S42).

Steps S31 to S42 are executed for each cluster i.

Figure 10:
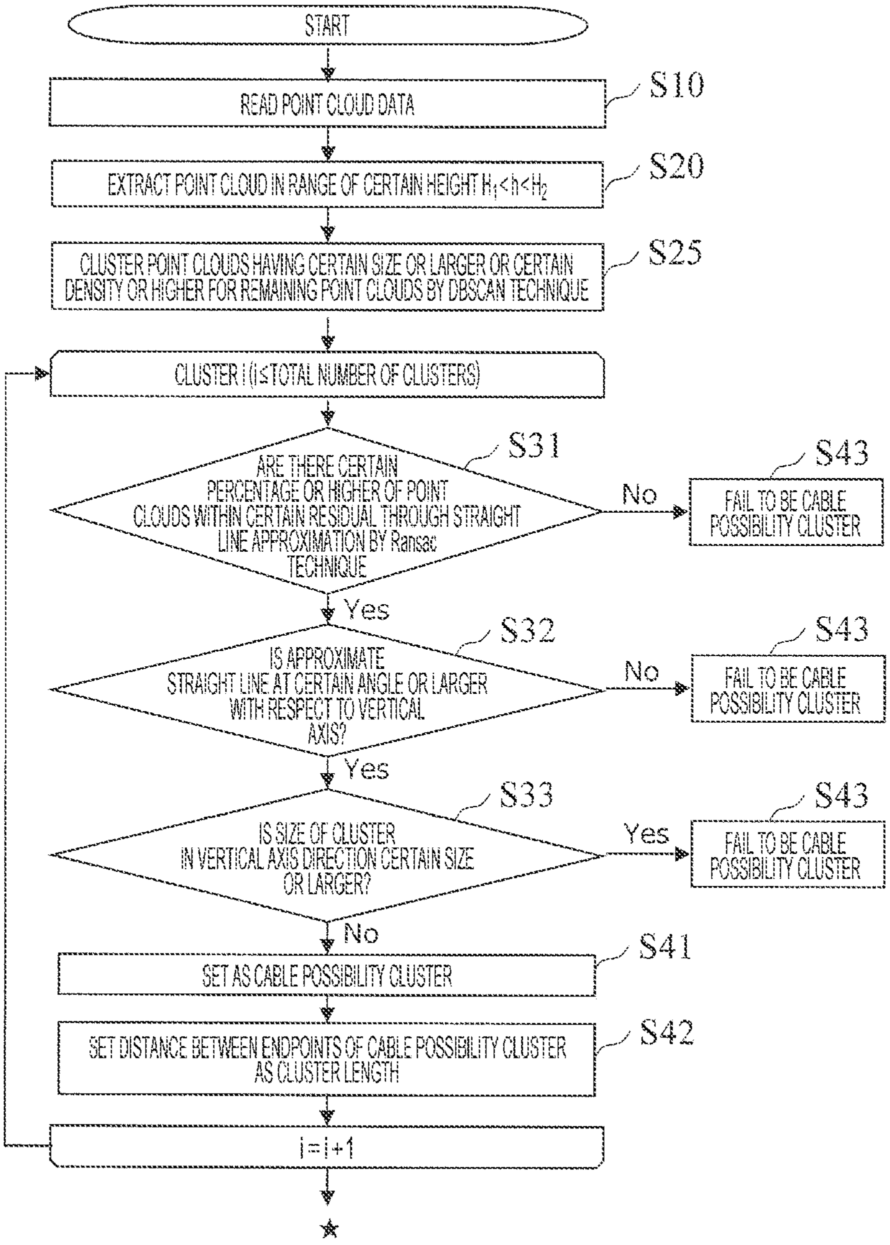
FIG. 10 illustrates an example of a flowchart of processing in the functional unit 3-2.

FIG. 10 illustrates an example of a flowchart of processing in the functional unit 3-2.

The point cloud data is read (S10), and a point cloud in a certain height range of $H_1<h<H_2$ is extracted (S20).

Next, for the remaining point clouds, a point cloud having a certain size/density or more is set as a cluster by the DBSCAN technique (S25).

Next, the straight line approximation is performed by the RANSAC technique, and whether there are a certain percentage or higher of point clouds within a certain residual is determined (S31). In addition, it is determined whether the approximate straight line is at a certain angle or more with respect to the vertical axis (S32). In addition, whether the cluster in the vertical axis direction has a certain size or more is determined (S33).

In a case where a result is No in at least one of Steps S31 and S32 or in a case where a result is Yes in Step S33, the cable possibility cluster is not set (S43). On the other hand, in a case where the result is Yes in Steps S31 and S32 and No in Step S33, a cable possibility cluster is set (S41). A distance between endpoints of the cable possibility cluster is set as a cluster length (S42).

Steps S31 to S42 are executed for each cluster i.

Figure 11:
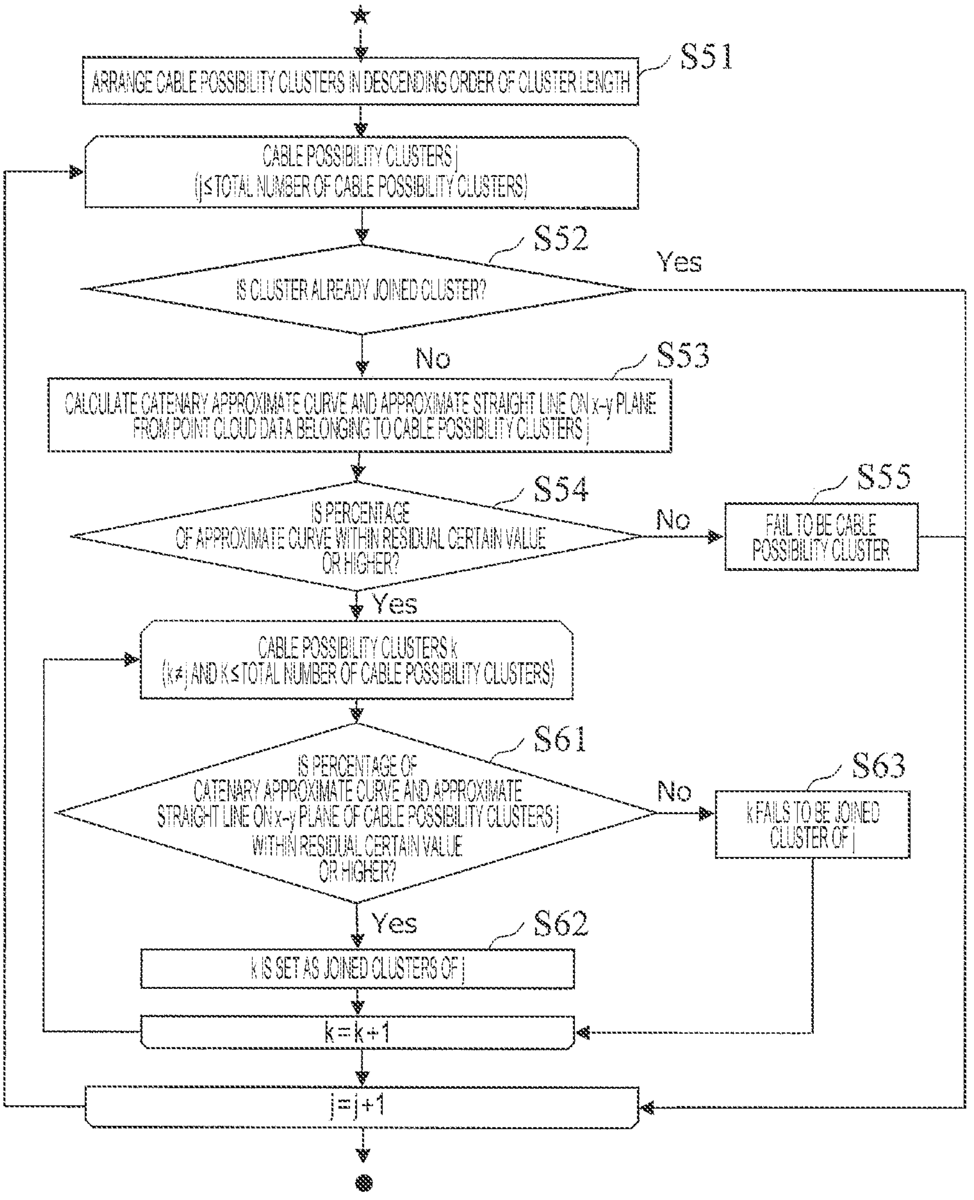
FIG. 11 illustrates an example of a flowchart of processing in a functional unit 3-3.

FIG. 11 illustrates an example of a flowchart of processing in the functional unit 3-3. The cable possibility clusters are arranged in a descending order from the cluster having the longest cluster length (S51), and whether the clusters are already combined is determined (S52). In a case where a result is No in Step S52, a catenary approximate curve and a RANSAC approximate straight line on the x-y plane are calculated from the point cloud data belonging to the cable possibility cluster j (S53). Then, whether a percentage within a residual of approximate curves is a certain value or more is determined (S54). Here, the "percentage within a residual" is the percentage of the point clouds whose distance to the approximated curve is within the threshold.

In a case where a result is Yes in Step S54, whether the catenary approximation curve of the cable possibility cluster j and the RANSAC approximation straight line on the x-y plane and the percentage within a residual are certain values or higher is determined (S61). In a case where a result is Yes in Step S61, k is a joined cluster of j (S62). In a case where the result is No in Step S61, k is not a joined cluster of j (S63). Steps S52 to S62 are executed for each cluster j.

Figure 12:
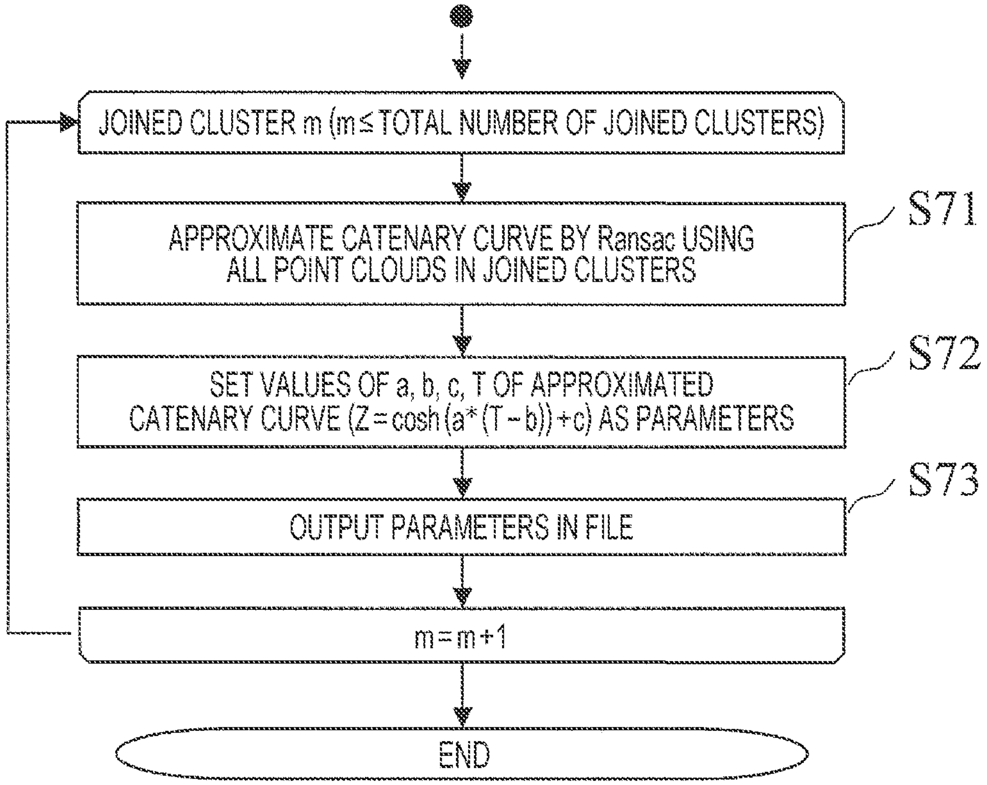
FIG. 12 illustrates an example of a flowchart of processing in a functional unit 3-4.

FIG. 12 illustrates an example of a flowchart of processing in the functional unit 3-4. The catenary curve approximation is performed by RANSAC using all the point clouds in the joined cluster (S71), values of a, b, c, and T of the approximated catenary curve (Z=cos h(a*(T−b))+c) are used as parameters (S72), and the parameters are output in a file (S73).

An example of processing of the various equipment information calculating unit 3-5 when extracting the cable will be described.

A range in which the cable is to be extracted is cut out from a range measured by the fixed point cloud, and a cut file is input as an LAS format file.

Step S0: read LAS file.

As a numpy array, x, y, and z of the read LAS file data are stored in the memory.

Step S1: find a mass and delete the mass.

Consequently, the point clouds corresponding to a tree and a house are erased.

For example, the point cloud is converted into Voxel with a Voxel size of a size of 0.1 m or the like of another object other than the cable. Then, Voxel is filtered. For example, each coordinate of the point cloud is projected on the xy plane, and if p % or higher of coordinates are present in DBSCAN n×n squares, the coordinates are deleted as a mass.

Step S2: cluster the point cloud other than the mass. For example, the remaining point cloud is three-dimensionally clustered (DBSCAN). Next, a cluster in which the angle formed by the straight line by RANSAC and the Z axis is a certain angle or larger is defined as a cable possibility cluster. Next, a straight distance between RANSAC endpoints of the cable possibility cluster is stored as the cluster length in the memory.

Step S3: generate a joined cluster. For example, the following Steps S3-1 to S3-4 are executed.

Step S3-1: select a cluster having the longest cluster length among the remaining cable possibility clusters. Hereinafter, in the embodiment, an example in which a cluster having a cluster length of less than 2.0 m is not set as a possibility when Steps S3-2 and S3-3 are performed will be described.

Step S3-2: perform RANSAC straight line approximation on the XY plane for the point cloud in the cable possibility cluster in Step S3-1. Since the RANSAC straight line can be expressed by a "fixed point" and a "value obtained by multiplying the direction vector by the variable T", catenary approximation is performed on the RANSAC straight line by T and Z.

Step S3-3: determine whether all the cable possibility clusters other than that in Step S3-1 are located on the RANSAC straight line of 3-2 on the XY plane (r=0.1, 60% or more) or on the catenary of Step S3-2 (r=0.05, valid=70% or more), and when the two determinations are OK, determine the clusters as joined clusters constituting the same object.

Step S3-4: return to Step S3-1.

Step S4: use the joined cluster as a catenary fitting model.

Step S4-1: perform RANSAC straight line approximation on the XY plane for the point cloud in the cluster determined as the joined cluster constituting the same object in Step S3. Since the RANSAC straight line can be expressed by a "fixed point" and a "value obtained by multiplying the direction vector by the variable T", catenary approximation is performed on the RANSAC straight line by T and Z.

Step S4-2: output a maximum value $T_{max}$ of T, a minimum value $T_{min}$ of T, the origin of an XY plane, a direction vector, and the catenary curve parameters a, b, c, and (Z=cos h(a*(T−b))+c) of T and Z.

The processing is performed as described above.

Figure 13:
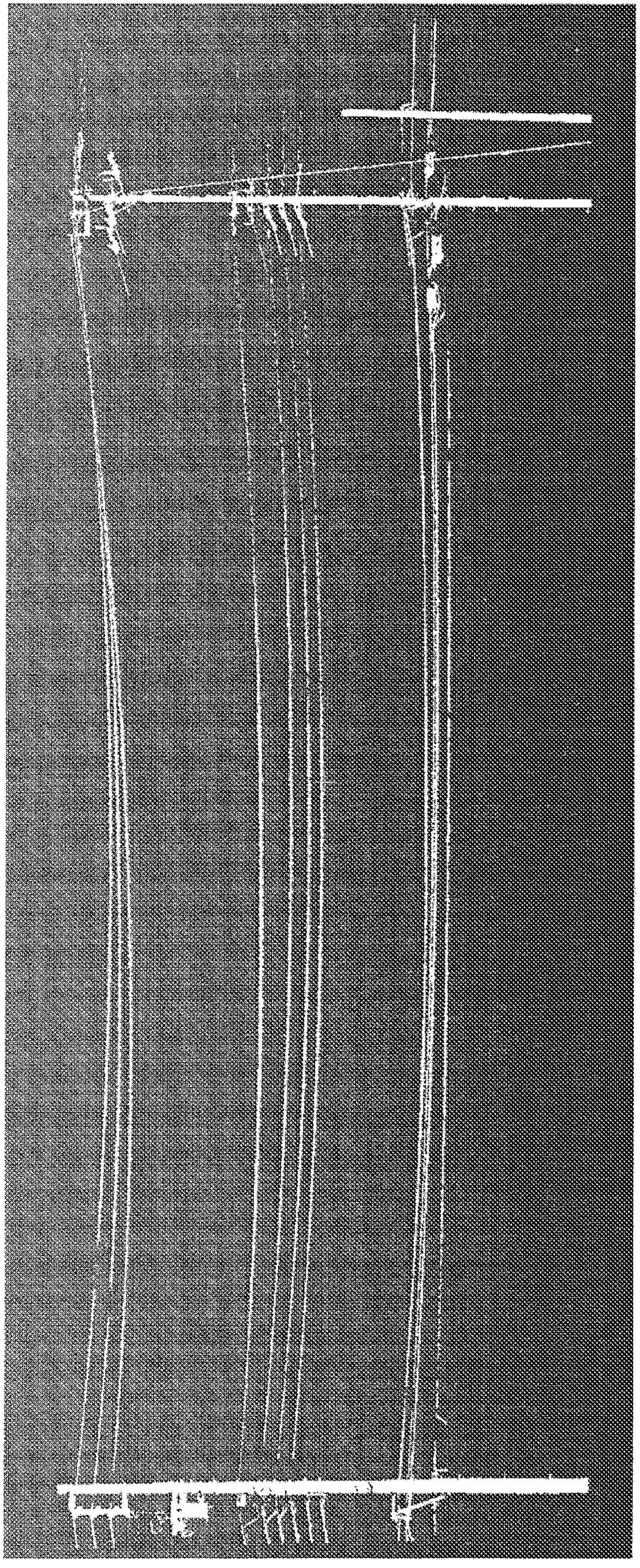
FIG. 13 illustrates an example of point cloud data read as an input by the functional unit 3-2.
Figure 14:
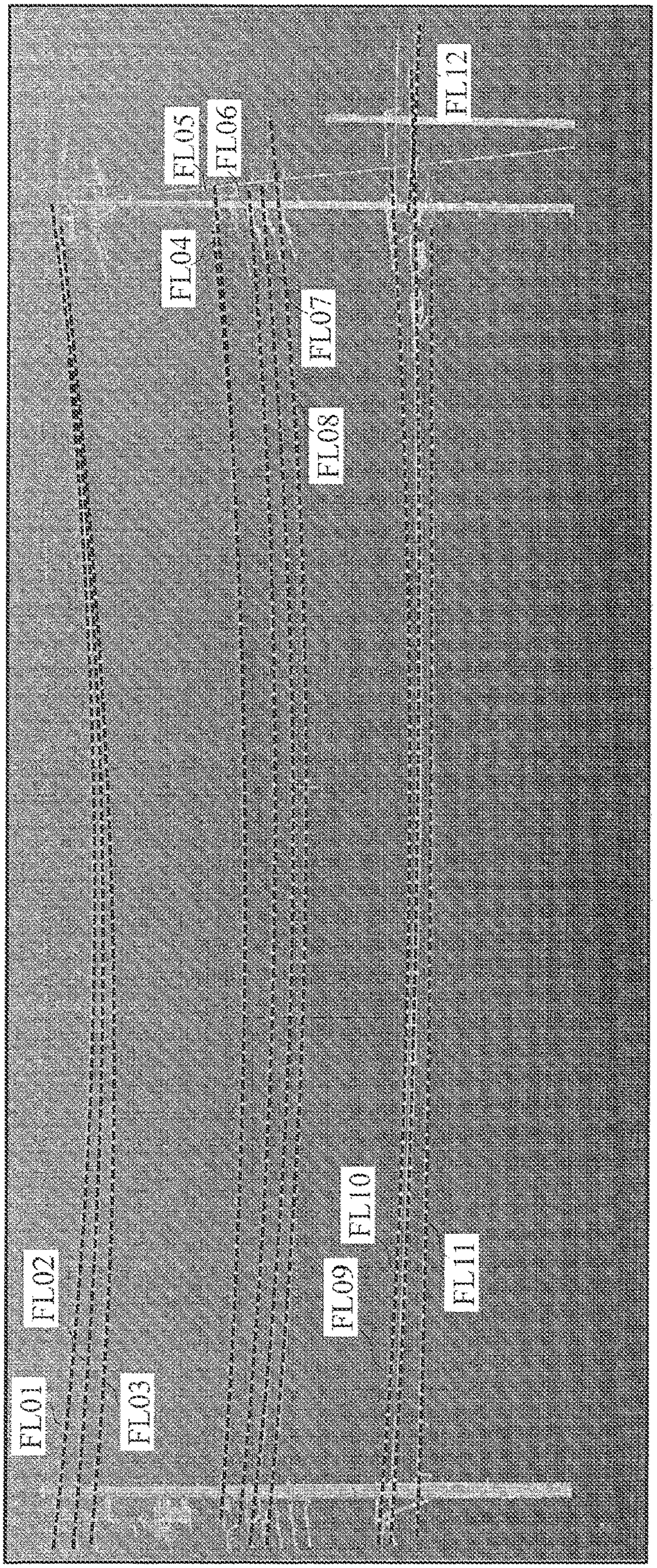
FIG. 14 illustrates an example of a cable model.
Figure 15:
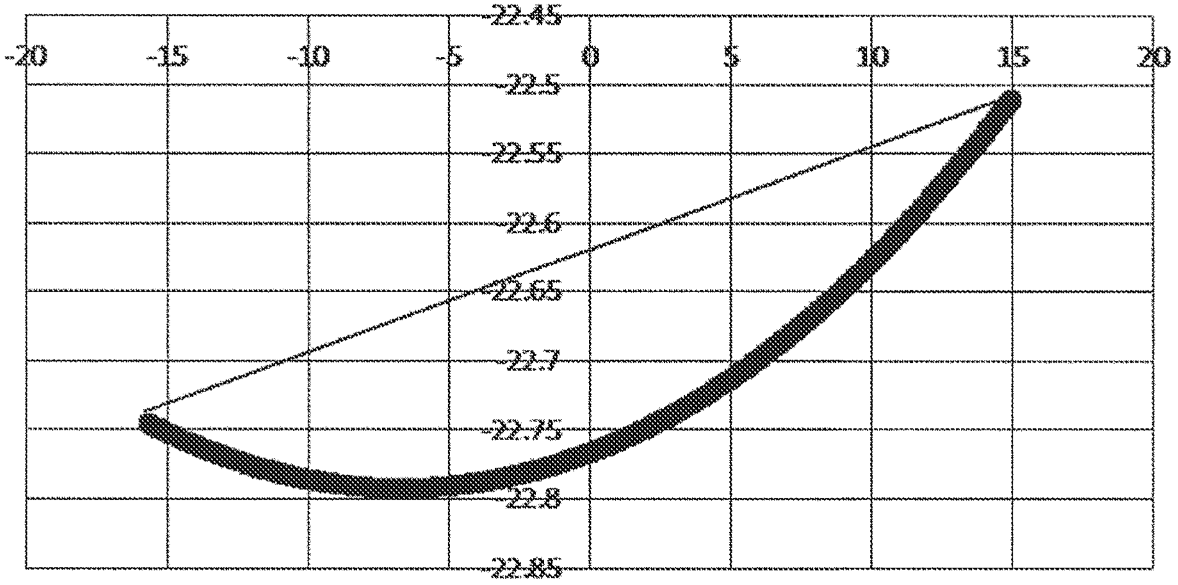
FIG. 15 illustrates an example when a model is actually created from a point cloud.

FIG. 13 illustrates an example of the point cloud data read as an input by the functional unit 3-2. This example illustrates an example in which an analysis target point cloud includes 2,803,930 points. FIG. 14 illustrates an example of the cable model 112. In this example, 12 joined clusters were extracted from the point cloud of FIG. 13. Broken lines FL01 to FL12 in FIG. 14 are cable models 112 obtained from the respective coupling clusters. FIG. 15 is an example when a model is actually created from the point cloud. A tension value was calculated based on the modeled cable model 112 obtained as a result of the actual creation, and the tension value was 1398.4 N. The tension of the cable obtained by measuring the point cloud in FIG. 13 was measured to be 1,285 N. Therefore, it has been found that the cable model obtained using the present disclosure can derive tension with a +9% error.

As described above, according to the present disclosure, when a three-dimensional model of a cable-like target equipment is created from three-dimensional point cloud data acquired by a three-dimensional laser scanner, a cable model is created by extracting a cluster that is linearly approximated as a cable possibility cluster from clusters generated from a three-dimensional point cloud, generating, for one cable possibility cluster, a joined cluster in which a three-dimensional point cloud within a percentage of a predetermined distance from a catenary approximation curve derived from the cluster is equal to or higher than a predetermined percentage, and connecting points included in the joined cluster.

Consequently, the present disclosure can create a cable model without depending on a distance between three-dimensional points. Hence, the present disclosure enables a three-dimensional model to be created even for an object which has unevenly spaced inter-point distances and only a part of a point cloud.

INDUSTRIAL APPLICABILITY

The present disclosure can be applied to the information and communications industry.

REFERENCE SIGNS LIST

1 Fixed 3D laser scanner
2 Storage medium
3 Arithmetic processing unit
3-1 Cable model extracting unit
3-2, 3-3, 3-4 Functional unit
3-5 Various-equipment information calculating unit

91 Point
92 Line
111 Utility pole model
110 Cable model

The invention claimed is:

1. An apparatus for creating a three-dimensional model of an object from point cloud data representing three-dimensional coordinates, the apparatus comprising one or more processors configured to execute instructions that cause the apparatus to perform operations comprising:
- clustering points included in the point cloud data to generate a plurality of clusters;
- calculating a cluster length for each cluster of the plurality of clusters, wherein the cluster length is based on a linear distance between endpoints of the cluster;
- selecting a first cluster having a maximum cluster length among the plurality of clusters;
- calculating a line on an x-y plane and a catenary curve in a three-dimensional space using the points included in the first cluster;
- extracting, from the plurality of clusters other than the first cluster, a second cluster comprising point clouds disposed on the line on the X-Y plane and located on the catenary curve in the three-dimensional space; and
- determining the first cluster and the extracted second cluster are a joined cluster;
- creating a three-dimensional model of the object by connecting points included in the joined cluster, wherein the object is an overhead cable, a suspension line, or a horizontal branch line.

2. The apparatus according to claim 1, wherein the operations further comprise:
- converting the point cloud data into voxels; and
- deleting voxels having a set density or higher on an x-y plane parallel to ground as a point mass of a house or the ground prior to clustering.

3. The apparatus according to claim 1, wherein the operations further comprise:
- extracting a point cloud having a z coordinate corresponding to a specified height from the point cloud data, and wherein the clustering is performed using the extracted point cloud data.

4. A method for creating a three-dimensional model of an object having a small diameter from point cloud data representing three-dimensional coordinates, the method comprising:
- clustering points included in the point cloud data to generate a plurality of clusters;
- calculating a cluster length for each cluster of the plurality of clusters, wherein the cluster length is based on a linear distance between endpoints of the cluster;
- selecting a first cluster having a maximum cluster length among the plurality of clusters;
- calculating a line on an x-y plane and a catenary curve in a three-dimensional space using the points included in the first cluster;
- extracting, from the plurality of clusters other than the first cluster, a second cluster comprising point clouds disposed on the line on the X-Y plane and located on the catenary curve in the three-dimensional space; and
- determining the first cluster and the extracted second cluster are a joined cluster;
- creating a three-dimensional model of the object by connecting points included in the joined cluster, wherein the object is an overhead cable, a suspension line, or a horizontal branch line.

5. A non-transitory computer-readable medium storing program instructions that, when executed, cause one or more processors to perform operations comprising:
- clustering points included in point cloud data to generate a plurality of clusters;
- calculating a cluster length for each cluster of the plurality of clusters, wherein the cluster length is based on a linear distance between endpoints of the cluster;
- selecting a first cluster having a maximum cluster length among the plurality of clusters;
- calculating a line on an x-y plane and a catenary curve in a three-dimensional space using the points included in the first cluster;
- extracting, from the plurality of clusters other than the first cluster, a second cluster comprising point clouds disposed on the line on the X-Y plane and located on the catenary curve in the three-dimensional space; and
- determining the first cluster and the extracted second cluster are a joined cluster;
- creating a three-dimensional model of an object by connecting points included in the joined cluster, wherein the object is an overhead cable, a suspension line, or a horizontal branch line.

* * * * *